United States Patent
Jang

(10) Patent No.: US 8,547,069 B2
(45) Date of Patent: Oct. 1, 2013

(54) SAFETY SWITCH FOR SECONDARY BATTERY MODULE FOR ELECTRIC VEHICLE AND CHARGING AND DISCHARGING SYSTEM FOR SECONDARY BATTERY MODULE FOR ELECTRIC VEHICLE USING THE SAME

(75) Inventor: Sooyeup Jang, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 428 days.

(21) Appl. No.: 12/989,907

(22) PCT Filed: Apr. 28, 2009

(86) PCT No.: PCT/KR2009/002204
§ 371 (c)(1),
(2), (4) Date: Oct. 27, 2010

(87) PCT Pub. No.: WO2009/134046
PCT Pub. Date: Nov. 5, 2009

(65) Prior Publication Data
US 2011/0037430 A1 Feb. 17, 2011

(30) Foreign Application Priority Data
Apr. 28, 2008 (KR) .................. 10-2008-0039278

(51) Int. Cl.
*H02J 7/00* (2006.01)
*H02J 7/16* (2006.01)

(52) U.S. Cl.
USPC .................................... 320/154; 320/150

(58) Field of Classification Search
USPC ......................... 320/109, 150–154
See application file for complete search history.

(56) References Cited

U.S. PATENT DOCUMENTS

| 5,781,013 | A | * | 7/1998 | Takahashi | 324/426 |
| 7,508,171 | B2 | | 3/2009 | Carrier et al. | |
| 2005/0077878 | A1 | | 4/2005 | Carrier et al. | |
| 2008/0241671 | A1 | * | 10/2008 | Cherng | 429/163 |

FOREIGN PATENT DOCUMENTS

| JP | 8126121 A | 5/1996 |
| JP | 2000322994 A | 11/2000 |
| JP | 2001-286067 A | 10/2001 |
| JP | 2002329456 A | 11/2002 |
| JP | 2002369372 A | 12/2002 |
| JP | 2005158352 A | 6/2005 |
| JP | 2005235680 A | 9/2005 |
| JP | 200619140 A | 1/2006 |
| JP | 2007520180 A | 7/2007 |
| KR | 10-2005-0088921 A | 9/2005 |
| KR | 10-2006-0050897 A | 5/2006 |
| KR | 10-2006-0041576 A | 11/2006 |
| KR | 10-2007-0017736 A | 2/2007 |

* cited by examiner

Primary Examiner — Samuel Berhanu
(74) Attorney, Agent, or Firm — The Webb Law Firm

(57) ABSTRACT

A safety switch of a secondary battery module for an electric vehicle includes a cutting member attached to one surface of one secondary battery cell in the secondary battery module for the electric vehicle configured by connecting at least two secondary battery cells and having a cutting body and a cut member attached to one surface of the other secondary battery cell while facing the cutting member and including a cut body configured to approach the cutting body of the cutting member and be cut by the approaching cutting body to electrically disconnect the secondary battery cells, when the secondary battery cells are expanded due to the swelling phenomenon.

9 Claims, 7 Drawing Sheets

(a)

(b)

(a) (b) (c)

(a)   (b)

(a)                    (b)

SAFETY SWITCH FOR SECONDARY BATTERY MODULE FOR ELECTRIC VEHICLE AND CHARGING AND DISCHARGING SYSTEM FOR SECONDARY BATTERY MODULE FOR ELECTRIC VEHICLE USING THE SAME

TECHNICAL FIELD

The present invention relates to a safety switch of a secondary battery module for an electric vehicle and a charge and discharge system of a secondary battery module for an electric vehicle using the same, and more particularly, to a technology capable of protecting a secondary battery module by operating a switch of the secondary battery module for the electric vehicle attached to the outside of the secondary battery module in order to disconnect a driving motor for the electric vehicle to the secondary battery module when the secondary battery module expands or excessive short-circuit current flows into circuits of the secondary battery module, due to a swelling phenomenon of expanding the secondary battery module due to an abnormal status of the secondary battery module, such as overcharge, heat exposure, short circuit, reverse connection, or the like, in using the secondary battery module for the electric vehicle.

BACKGROUND ART

Generally, a secondary battery can be recharged and manufactured as a large capacity battery. As a representative secondary battery, there may be a nickel-cadmium battery, a nickel-hydrogen battery, and a lithium-ion battery, or the like.

Among others, the lithium-ion battery has been in the limelight as a next-generation power source due to excellent characteristics, such as a long lifespan, a large capacity, etc. However, there is a problem in that the lithium-ion battery generates gas due to electrochemical reaction therein when it is exposed to abnormal environments due to overcharge and heat exposure, which increases the internal pressure of the battery.

The lithium-ion battery expands due to the increase in internal pressure thereof. In particular, the internal pressure and temperature of the lithium-ion battery are suddenly increased due to a partial decomposition of an electrolyte or active materials when the abnormal time, such as overcharge, or the like, is continued, such that there is a risk of causing an explosion or a fire of the lithium-ion battery.

In addition, when the lithium-ion battery is exposed to abnormal environments, such as short-circuit and reverse connection, excessive short-circuit current flows into main circuits of the lithium-ion battery to lead to phenomena such as excessive electrochemical reaction and short-circuit, such that there is a risk of causing an explosion or a fire of the lithium-ion battery.

In order to solve the above-mentioned problems, various thermal and electrical safety tests, such as overcharge, heat exposure, short-circuit, reverse connection, or the like, have been conducted in order to verify the safety of the secondary battery.

In this case, a secondary battery should not be fumed, ignited, and exploded in thermal and electrical safety test environments at the time of testing the safety of the secondary battery.

Meanwhile, various attempts to improve safety of a secondary battery have been conducted up to now. Among others, a method of discharging gas generated from the inside of a secondary battery through a rupture part of a secondary battery case or a method of directly interrupting main circuits of a secondary battery by using a rupture disk in the secondary battery have been developed.

In this case, when an internal pressure exceeds a design value due to gas generated in abnormal environments, such as overcharge, etc., the internal pressure of the secondary battery is reduced and the safety thereof is secured, by a manner of rupturing a sealing part or interrupting a power supply of the secondary battery. However, a spark generated at the time of the rupture of the sealing part is operated as an ignition source, such that there is a problem of causing the explosion and fire of the secondary battery.

In order to solve the above-mentioned problem, a protective apparatus of a secondary battery using a switch has been suggested.

FIG. 1 is a representative figure of Patent Application No. 10-2006-0041576 (Title: Protective Circuit for Secondary Battery And Secondary Battery Using The Same; Filing Date May 9, 2006) that is a related art.

As shown in FIG. 1, the related art is configured to include a bimetal (BM1) and a resistor R1.

One of three terminals of the bimetal BM1 is connected to a positive (+) pole of a secondary battery V1, the other thereof is connected to a positive (+) pole of an external electrode (not shown), and the final one thereof is connected to one end of the resistor R1.

The other end of the resistor R1 is connected to a negative (−) pole of the secondary battery V1. The secondary battery V1 and the negative (−) pole of the external electrode are connected to each other.

In this configuration, the resistor R1 may be directly connected to the bimetal BM1 or connected to the bimetal BM1 through a conducting wire.

The operation of the related art having the above-mentioned configuration will be described below.

Next, the bimetal BM1 connects the positive (+) pole of the second battery V1 to the positive (+) pole of the external electrode at a normal temperature and connects the positive (+) pole of the secondary battery V1 to the negative (−) pole of the external electrode through the resistor R1.

Subsequently, the secondary battery V1 is short-circuited at a high temperature to interrupt the supply of current from the external electrode and discharge current through bimetal BM1 and the resistor R1.

The related art having the above-mentioned configuration and operation controls a switching operation according to temperature to protect the secondary battery; however, has a problem in that an expensive bimetal device is used to perform the switching operation according to the temperature as described above.

In addition, it is difficult to precisely control the bimetal device operated according to temperature and there is a problem in that the secondary battery is completely exposed to the risk when the switching operation is not performed at the high-temperature state.

In addition, the related art can partially protect the secondary battery in the case of protecting the secondary battery against overcharge; however, there is a problem in that the related art does not have countermeasures against a malfunction and a misuse of the secondary battery, such as short-circuit, reverse connection, or the like.

Moreover, there is a problem in that the related art has not yet established a method of simultaneously solving the expansion phenomenon caused by the chemical change in the secondary battery due to overcharge, or the like, and the excessive short-circuit current due to short-circuit.

DISCLOSURE

Technical Problem

An object of the present invention is to provide a safety switch of a secondary battery module for an electric vehicle capable of preventing a rupture of the secondary battery module due to an expansion phenomenon of the secondary battery module for the electric vehicle and an explosion and fire of the secondary battery module due to the discharge of hazardous gas, which are generated due to the increase in internal pressure of the secondary battery module for the electric vehicle under overcharge and heat exposure situations during the use of the secondary battery for the electric vehicle.

Another object of the present invention is to provide a safety switch of a secondary battery for an electric vehicle capable of preventing a rupture of the secondary battery module for the electric vehicle due to excessive short-circuit current and an explosion and fire of the secondary battery module due to the discharge of hazardous gas, which are generated under short-circuit and reverse connection situations during the use of the secondary battery module for the electric vehicle.

Another object of the present invention is to provide a charge and discharge system of a secondary battery module for an electric vehicle using a safety switch of a secondary battery module for an electric vehicle capable of preventing an explosion of the secondary battery module due to abnormal operations, such as overcharge, heat exposure, short-circuit, or the like, of the secondary battery module for the electric vehicle.

Technical Solution

In one general aspect, a safety switch of a secondary battery module for an electric vehicle includes: a cutting member 110 attached to one surface of any one secondary battery cell 10 in the secondary battery module for the electric vehicle configured by connecting at least two secondary battery cells and having a cutting body 112; and a cut member 120 attached to one surface of the other secondary battery cell 20 while facing the cutting member 110 and including a cut body 123 approaching the cutting body 112 of the cutting member 110 and cut by the approaching cutting body 112 to electrically disconnect the secondary battery cells, when the secondary battery cells are expanded due to the swelling phenomenon.

The cutting member 110 may include a cutting body supporting part 111 attached to any one secondary battery cell 10 and the cutting body 112 protruded outwardly from the cutting body supporting part 111 and having an end formed of a blade 113.

The cut member 120 attached to the other secondary battery cell 20 may include a cut body supporting part 121 including a cutting body inserting groove 122 into which the cutting body 112 is inserted and a cut body 123 stacked on the entire surface of the cut body supporting part 121 and having a cutting part 124 cut by the cutting body 112 at the center of a plate.

The cut body 123 may be connected to the other secondary battery cell 20 and may be formed in a fuse structure fused when short-circuit current is generated.

The cut body 123 may be provided with a plurality of holes 125 or notches to facilitate cutting and fusing.

The cutting member 110 and the cut member 120 may be protected by a material absorbing heat and spark generated when the cut body 123 is fused.

The cutting member 110 and the cut member 120 may be applied with a flame-retardant insulating material.

In another general aspect, a charge and discharge system of a secondary battery module for an electric vehicle includes: a secondary battery module 200 for the electric vehicle configured by stacking at least two secondary battery cells 201 supplying power to an electric vehicle; a charger 220 in which power generated by the secondary battery module 200 for the electric vehicle is charged; a driving motor 240 supplied with power from the secondary battery module 200 for the electric vehicle to generate power; an inverter unit 230 controlling the speed and direction of the driving motor 240; a battery relay unit 210 controlling the connection between the secondary battery module 200 and the driving motor 240 for the electric vehicle; and at least one safety switch 100 provided between the secondary battery cells configuring the secondary battery module 200 for the electric vehicle and controlling the electrical disconnection operation of the secondary battery cells according to the displacement due to swelling phenomenon of the secondary battery module 200 for the electric vehicle.

The safety switch 100 of the secondary battery module for the electric vehicle may be operated when a displacement is generated in the secondary battery module 200 for the electric vehicle to interrupt the circuit connection between the secondary battery module 200 and the driving motor 240 for the electric vehicle.

Advantageous Effects

According to the safety switch of the secondary battery module for the electric vehicle and the charge and discharge system of a secondary battery module for an electric vehicle of the present invention, the swelling phenomenon caused due to the overcharge, short-circuit, reverse connection, and heat exposure of the secondary battery module and the heat generation and explosion of the secondary battery module caused due to the short-circuit current can be safely secured by a single apparatus.

Further, the present invention fundamentally interrupts the charge power by the method of sensing the swelling phenomenon of the secondary battery module to directly interrupt the main circuits when the internal pressure of the secondary battery module is increased, thereby making it possible to protect the secondary battery module without causing the leak or the rupture of the secondary battery module.

In addition, the present invention can prevent the fire and explosion of the secondary battery module caused due to gas generated at the time of the rupture of the secondary battery module.

Moreover, the present invention can prevent a human body from being damaged due to the hazardous gas generated at the time of the rupture of the secondary battery module.

DESCRIPTION OF DRAWINGS

The above and other objects, features and advantages of the present invention will become apparent from the following description of preferred embodiments given in conjunction with the accompanying drawings, in which.

[Detailed Description of Main Elements]

Figure 1:
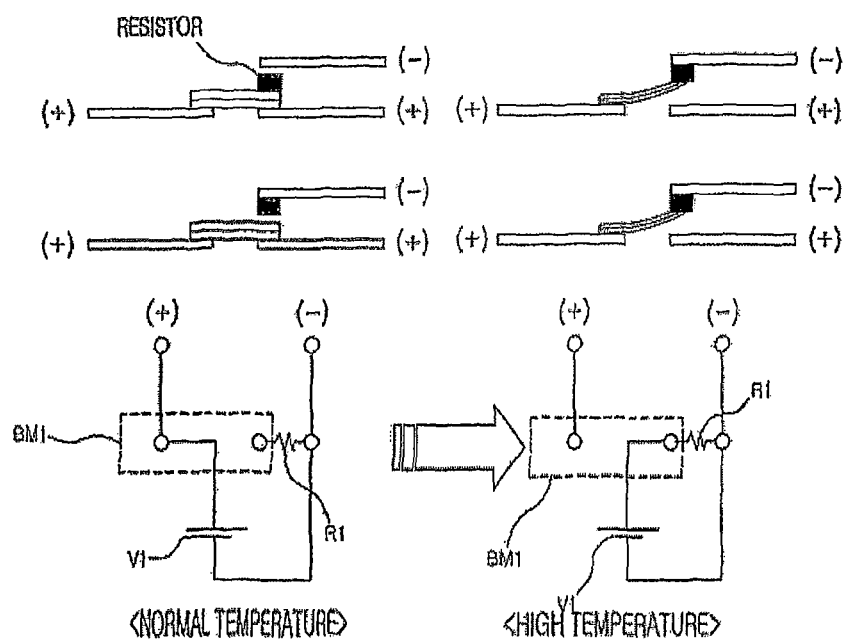
FIG. 1 is a cross-sectional view of a safety device of a secondary battery module according to the related art.

| | |
|---|---|
| 10: Any one secondary battery | 20: Other secondary battery |
| 21: Positive pole | 22: Negative pole |
| 30: First connection line | 40: Second connection line |
| 100: Safety switch of secondary battery for electric vehicle | 110: Cutting member |
| 111: Cutting body supporting part | |
| 112: Cutting body | 113: Blade |
| 120: Cut member | 121: Cut body supporting part |
| 122: Cutting body insertion groove | |
| 123: Cut body | 124: Cutting portion of cut body |
| 125: Hole | 200: Secondary battery for electric vehicle |
| 201: Secondary battery | 210: Battery relay unit |
| 211: first battery relay | 212: second battery relay |
| 220: Charger | 230: Inverter unit |
| 240: Driving motor | |

BEST MODE

Hereinafter, the embodiments of the present invention will be described in detail with reference to accompanying drawings. Hereinafter, a safety switch of a secondary battery module for an electric vehicle and a charge and discharge system of a secondary battery module for an electric vehicle using the same according to the present invention will be described in detail with reference to the accompanying drawings. The drawings to be described below are provided by way of example so that the idea of the present invention can be sufficiently transferred to those skilled in the art to which the present invention pertains. Therefore, the present invention may be implemented in many different forms, without being limited to the drawings to be described below. Further, like reference numerals denote like components throughout the specification.

Meanwhile, unless technical and scientific terms used herein are defined otherwise, they have meanings understood by those skilled in the art to which the present invention pertains. Known functions and components will be omitted so as not to obscure the description of the present invention with unnecessary detail.

Figure 2:
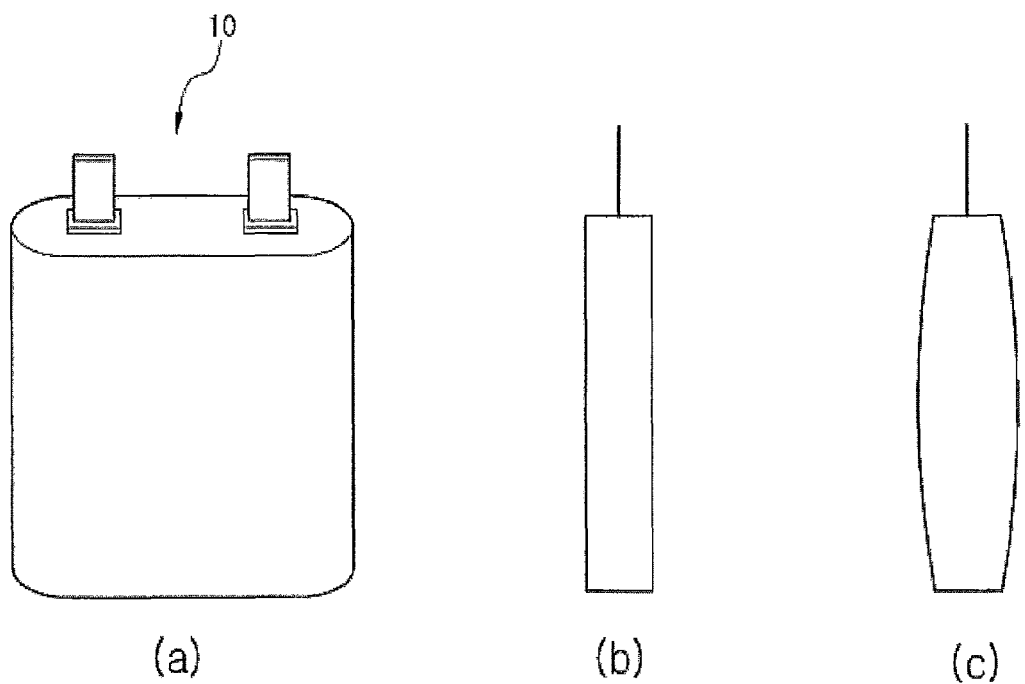
FIG. 2 is a conceptual diagram of an expansion phenomenon of a secondary battery module.
Figure 3:
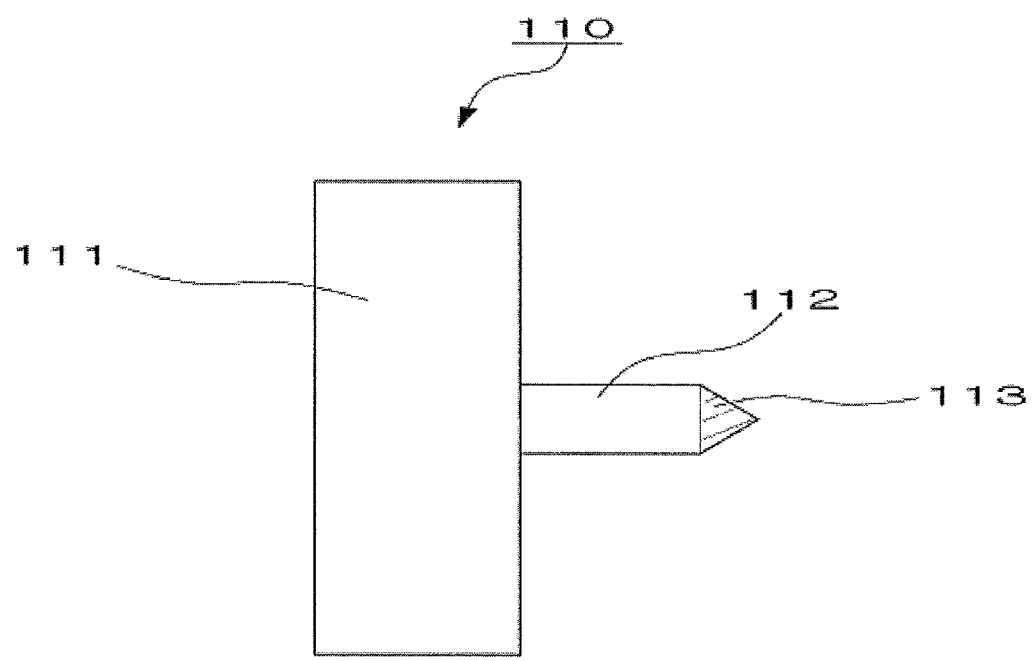
FIG. 3 is a side view showing a cutting member of a safety switch of a secondary battery module for an electric vehicle of the present invention.
Figure 4:
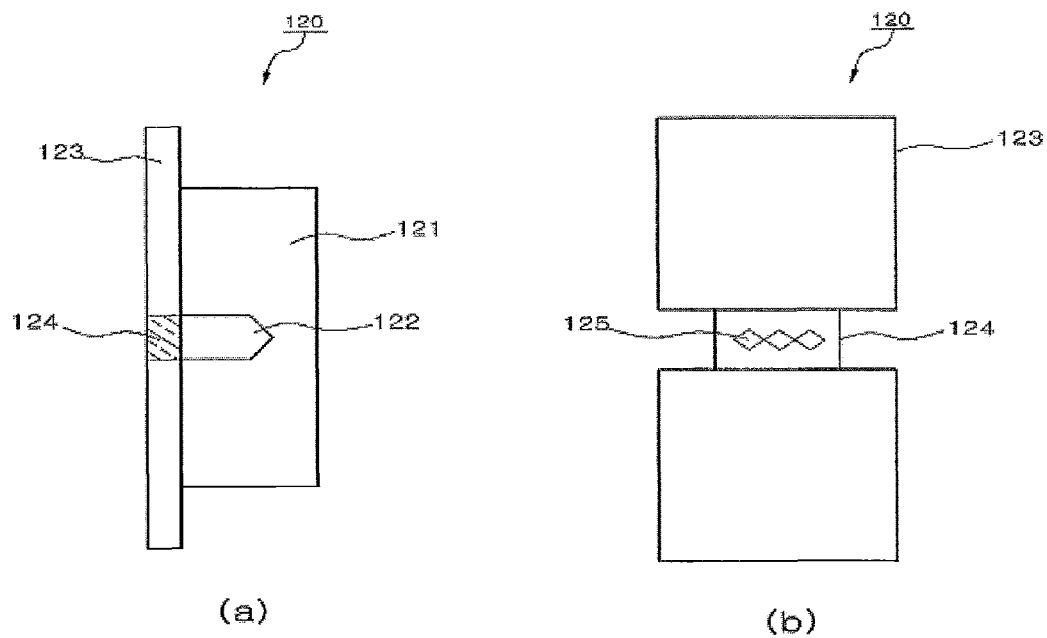
FIG. 4A is a side view showing a cut member of the safety switch of a secondary battery module for an electric vehicle of the present invention.
FIG. 4B is a front view showing the cut member of the safety switch of a secondary battery module for an electric vehicle of the present invention.
Figure 5:
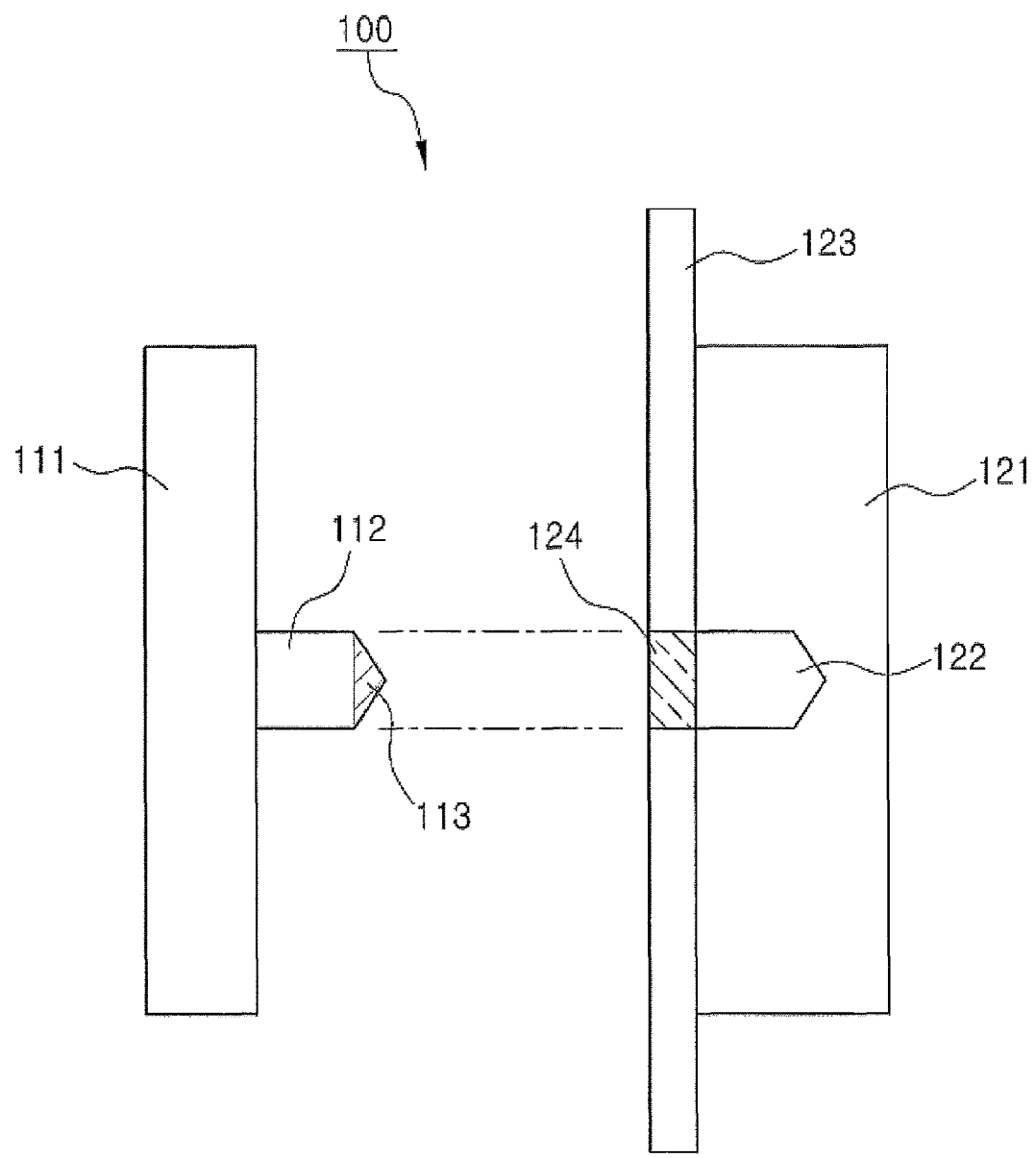
FIG. 5 is a side view showing the safety switch of the secondary battery module for the electric vehicle of the present invention.
Figure 6:
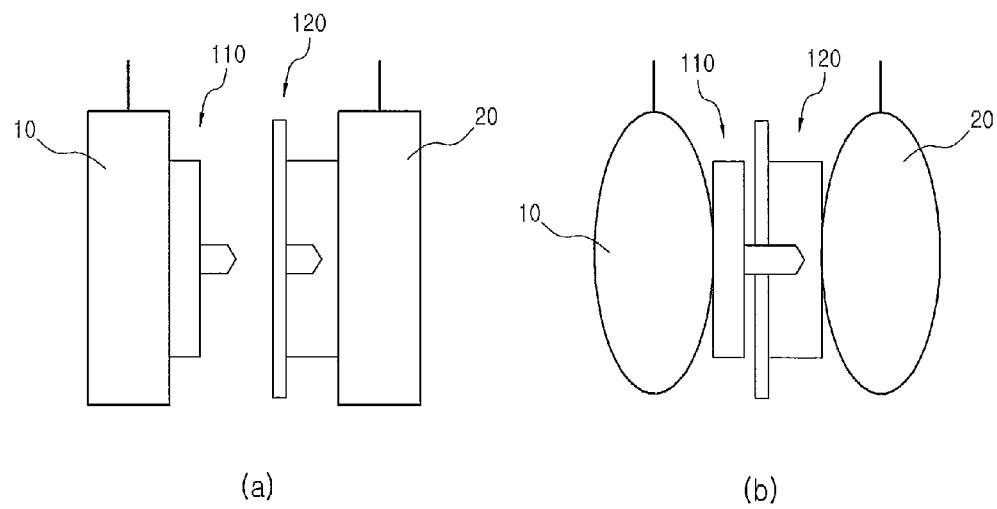
FIG. 6A is a state diagram showing a normal state of the safety switch of the secondary battery module for the electric vehicle of the present invention.
FIG. 6B is a state diagram showing an operational state of the safety switch of the secondary battery module for the electric vehicle of the present invention.
Figure 7:
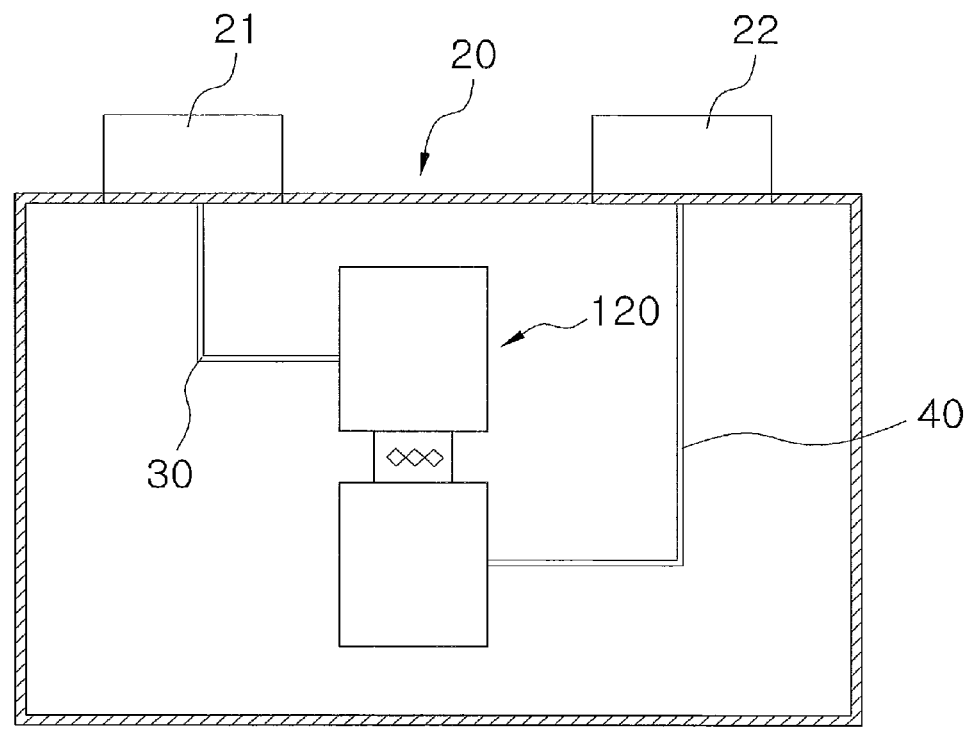
FIG. 7 is a conceptual diagram showing a state where the cut member of the safety switch of the secondary battery module for the electric vehicle of the present invention is seated in the secondary battery module.
Figure 8:
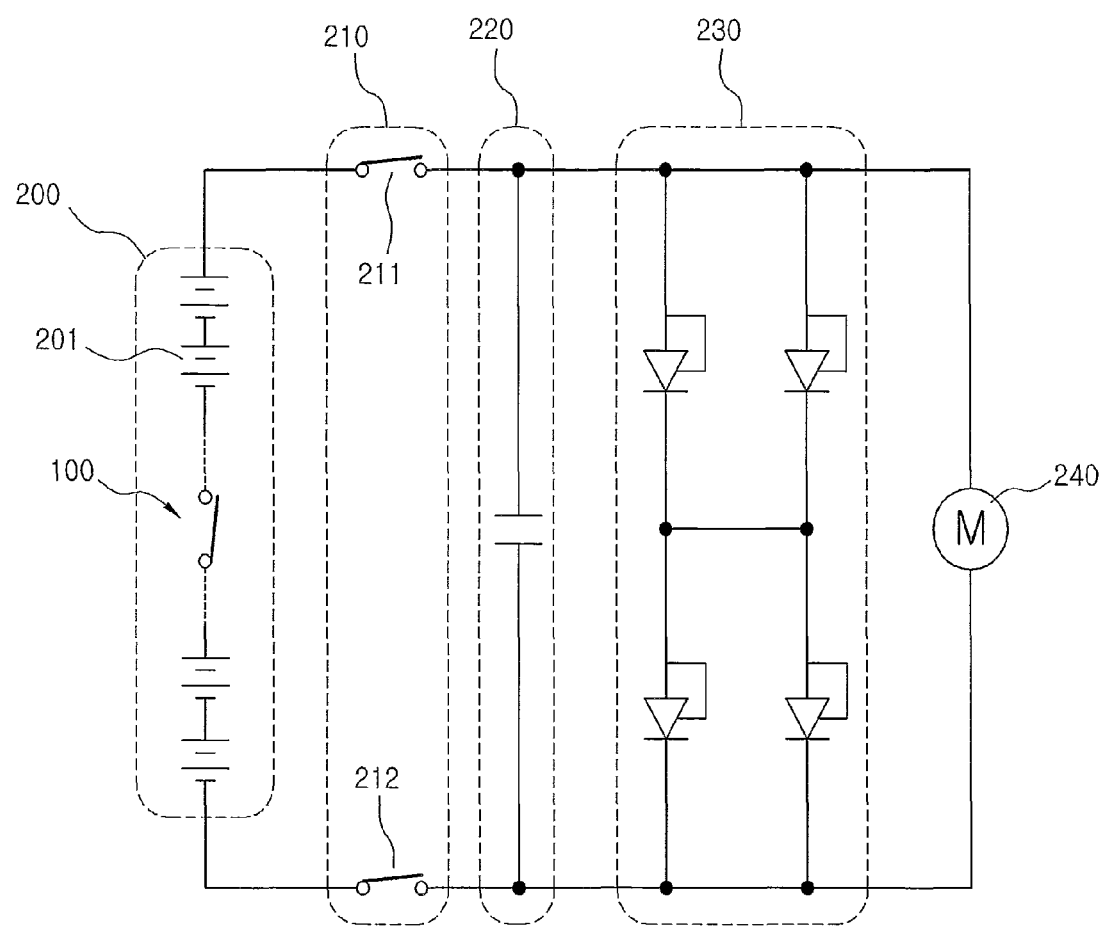
FIG. 8 is a conceptual diagram showing a state where the safety switch of the secondary battery module for the electric vehicle of the present invention is connected to a motor and a charge control circuit for an electric vehicle.

FIG. 2 is a conceptual diagram of an expansion phenomenon of a secondary battery module, FIG. 3 is a side view showing a cutting member of a safety switch of a secondary battery module for an electric vehicle of the present invention, FIG. 4A is a side view showing a cut member of the safety switch of a secondary battery module for an electric vehicle of the present invention, FIG. 4B is a front view showing the cut member of the safety switch of a secondary battery module for an electric vehicle of the present invention, FIG. 5 is a side view showing the safety switch of the secondary battery module for the electric vehicle of the present invention, FIG. 6A is a state diagram showing a normal state of the safety switch of the secondary battery module for the electric vehicle of the present invention, FIG. 6B is a state diagram showing an operational state of the safety switch of the secondary battery module for the electric vehicle of the present invention, FIG. 7 is a conceptual diagram showing a state where the cut member of the safety switch of the secondary battery module for the electric vehicle of the present invention is seated in the secondary battery module, and FIG. 8 is a conceptual diagram showing a state where the safety switch of the secondary battery module for the electric vehicle of the present invention is connected to a motor and a charge control circuit for an electric vehicle.

First, an expansion phenomenon of a secondary battery module 10 will be described below with reference to FIG. 2.

Next, FIG. 2A is a front view of the secondary battery cell 10, FIG. 2B is a side view of the secondary battery cell 10, and FIG. 2C shows a state where the secondary battery cell 10 is expanded due to a swelling phenomenon caused by a malfunction, such as overcharge, reverse connection, or the like, of the secondary battery cell 10.

Next, the secondary battery cell 10 has a sealed structure. Considering characteristics of the sealed structure, gas is generated from the inside of the secondary battery cell 10 to expand the secondary battery cell 10 when the secondary battery cell 10 is in a transit state, such as overcharge, short-circuit, reverse connection, heat exposure, or the like. If the expansion is continued, the secondary battery cell 10 leaks chemicals, such as an electrolyte, etc., from the inside thereof or may be ignited and exploded if a considerable amount of chemicals are leaked.

Next, a safety switch 100 of a secondary battery module for an electric vehicle according to the present invention for preventing the above-mentioned expansion phenomenon of the secondary battery cell 10 will be described with reference to FIGS. 3 to 5.

As shown in FIGS. 3 to 5, the safety switch 100 of the secondary battery module for the electric vehicle is configured to include a cutting member 110 including a cutting body 112 and a cut member 120 including a cut body 123 cut by the cutting body 112 of the cutting member 110.

In this configuration, the cutting member 110 is configured to include a cutting body supporting part 111 and the cutting body 112 protruded outwardly from the cutting body supporting part 111 and having an end formed of a blade 113.

In addition, the cut member 120 attached to the other secondary battery cell 20 is configured to include a cut body supporting part 121 including a cutting body inserting groove 122 into which the cutting body 112 is inserted and a cut body 123 stacked on the entire surface of the cut body supporting part 121 and having a cutting part 124 cut by the cutting body 112 at the center of a plate.

In this configuration, the cut body 123 has the same width as the cutting body 112 and is provided with a plurality of holes 125 or notches to be easily cut or fused, wherein the hole 125 preferably has a diamond shape.

In addition, it is preferable that the cut body 123 is made of a material having a low fusing point to be easily fused.

Next, the safety switch 100 of the secondary battery module for the electric vehicle having the above-mentioned configuration is installed between at least two secondary battery cells 201 to be used as a safety device of a secondary battery module 200 for an electric vehicle, wherein a secondary battery module 200 is configured by electrically connecting the at least two secondary battery cells 201.

The state where the safety switch 100 of the secondary battery module for the electric vehicle is inserted between secondary battery cells and the operation thereof will be described with reference to FIGS. 6 and 7.

As shown in FIG. 6A, the cutting member 110 of the safety switch 100 of the secondary battery module for the electric vehicle is attached to one surface of any one secondary battery cell 10 and the cut member 120 is attached to one surface of the other secondary battery cell 20 facing the cutting member 110.

In this case, an example where any one secondary battery cell 10 and the other secondary battery cell 20 are applied to two secondary battery cells in the secondary battery module 200 for the electric vehicle in which at least two secondary battery cells are stacked was described.

Next, as shown in FIG. 7, in the cut member 120, the upper portion of the cut body 123 is connected to a positive pole 21 of any one secondary battery cell 20 by a first connection line 30 and the lower portion of the cut body 123 is connected to a negative pole 22 of the other secondary battery cell 20 by a second connection line 40.

Subsequently, when the expansion occurs by the swelling phenomenon due to situations, such as overcharge, heat exposure, short-circuit, reverse connection, or the like, of any one secondary battery cell 10 and the other secondary battery cell 20, the safety switch 100 of the secondary battery module for the electric vehicle is operated.

As shown in FIG. 6B, the cutting member 110 approaches the cut member 120 by any one secondary battery cell 10 and the other secondary battery cell 20 expanded due to the swelling phenomenon.

Next, the cutting body 112 having the blade 113, which is provided in the cutting member 110, cuts the cutting part 124 of the cut body 123 of the cut member 120 and is inserted into the cutting body insertion groove 122 due to the approach of the cutting member 110 and the cut member 120.

Next, the cutting portion 124 is cut to electrically disconnect any one secondary battery cell 10 from the other secondary battery cell 20, such that the secondary battery module 200 for the electric vehicle stops the supply of power and the swelling phenomenon of any one secondary battery cell 10 and the other secondary battery cell 20 is blocked, thereby preventing the explosion and fire of the secondary battery module.

Meanwhile, the cut body 123 is fused by sensing when short-circuit current is generated at the connection parts of circuits of the charge and discharge system of the secondary battery module 200 for the electric vehicle.

Next, the fusing will be described below. The cutting portion 124 of the cut body 123 is fused to prevent the other secondary battery cell 20 from being abnormally operated due to the generation of the short-circuit current, such that the positive pole 21 and the negative pole 22 of the other secondary battery cell 20 connected by the first connection line 30 and the second connection line 40 are disconnected from each other, thereby stopping the operation of the other secondary battery cell 20.

In addition, it is preferable that a flame-retardant insulating material or a material capable of absorbing heat and spark is applied to the entire surface of the cutting member 110 and the cut member 120 in order to prevent the electrical spark generated at the time of cutting the cut body 123 from being diffused.

In addition, it is preferable that the cut body 123 is protected with a material capable of absorbing overheat generated when it is cut or fused and heat and spark generated when it is fused.

Herein, the material absorbing the heat and spark may be silica ($SiO_2$) absorbing instant arc heat generated at the time of fusing the cut body 123 and serving as liquefaction and current extinguishing.

Next, the charge and discharge system of the secondary battery module for the electric vehicle with the safety switch 100 of the secondary battery module for the electric vehicle will be described with reference to FIG. 8.

As shown in FIG. 8, the charge and discharge system of the secondary battery module for the electric vehicle is configured to include: the secondary battery module 200 for the electric vehicle configured by stacking at least two secondary battery cells 201 supplying power to an electric vehicle; a charger 220 in which power generated by the secondary battery module 200 for the electric vehicle is charged; a driving motor 240 supplied with power from the secondary battery module 200 for the electric vehicle to generate power; an inverter unit 230 controlling the speed and direction of the driving motor 240; a battery relay unit 210 controlling the connection between the secondary battery module 200 and the driving motor 240 for the electric vehicle; and at least one safety switch 100 of the secondary battery module for the electric vehicle provided between the secondary battery cells configuring the secondary battery module 200 for the electric vehicle and controlling the electrical disconnection operation of the secondary battery cells according to the displacement due to swelling phenomenon of the secondary battery module 200 for the electric vehicle.

Next, the secondary battery module 200 for the electric vehicle supplies the driving power to the driving motor 240, wherein the secondary battery module 200 and the driving motor 240 for the electric vehicle are connected by the circuits and the connection between the circuits is controlled by the battery relay unit 210:

Next, the battery relay unit 210 is configured of a pair of a first battery relay 211 and a second battery relay 212.

Next, the battery relay unit 210 performs a control to supply power to the driving motor 240 and charges power generated from the secondary battery module 200 for the electric vehicle in the charger 220.

Next, the driving motor 240 is driven by being supplied with power generated from the secondary battery module 200 for the electric vehicle, which is charged in the charger 220.

Next, the inverter unit 230 is configured of four inverters to control the speed and direction of the driving motor.

Although the inverter 230 uses four inverters to help the understanding of explanation herein, it may be modified according to the operational state and size of the driving motor 240.

Next, when the displacement above the setting value is in at least one secondary battery cell 201 configuring the secondary battery module 200 for the electric vehicle or the excessive short-circuit current flows thereinto, due to the malfunctions such as overcharge, reverse connection, heat exposure, and short-circuit during the process of performing a control by the battery relay unit 210, supplying power to the driving motor 240, controlling the driving motor 240 by the inverter unit 230, and charging the power in the charger 220, the safety switch 100 of the secondary battery module for the electric vehicle is operated.

Next, the safety switch 100 for the electric vehicle cuts the cut body 123 when the displacement above the set value is applied to the secondary battery module 200 for the electric vehicle due to the swelling phenomenon and fuses it when the excessive short-circuit current flows into the secondary battery module 200 for the electric vehicle, thereby directly interrupting the circuit connection between the secondary battery module 200 and the driving motor 240 for the electric vehicle.

INDUSTRIAL APPLICABILITY

According to the safety switch of the secondary battery module for the electric vehicle and the charge and discharge system of a secondary battery module for an electric vehicle of the present invention, the swelling phenomenon caused due to the overcharge, short-circuit, reverse connection, and heat exposure of the secondary battery module and the heat generation and explosion of the secondary battery module caused due to the short-circuit current can be safely secured by a single apparatus.

Further, the present invention fundamentally interrupts the charge power by the method of sensing the swelling phenomenon of the secondary battery module to directly interrupt the main circuits when the internal pressure of the secondary battery module is increased, thereby making it possible to protect the secondary battery module without causing the leak or the rupture of the secondary battery module.

In addition, the present invention can prevent the fire and explosion of the secondary battery module caused due to gas generated at the time of the rupture of the secondary battery module.

Moreover, the present invention can prevent a human body from being damaged due to the hazardous gas generated at the time of the rupture of the secondary battery module.

The invention claimed is:

1. A safety switch of a secondary battery module for an electric vehicle, comprising:
   a cutting member attached to one surface of one secondary battery cell of at least two secondary battery cells in the secondary battery module for the electric vehicle configured by connecting the at least two secondary battery cells and having a cutting body; and
   a cut member attached to one surface of the other secondary battery cell of the at least two secondary battery cells while facing the cutting member and including a cut body configured to approach the cutting body of the cutting member and be cut by the approaching cutting body to electrically disconnect the secondary battery cells when the secondary battery cells are expanded due to a swelling phenomenon, wherein an upper portion of the cut body is connected to a positive pole of the one secondary battery cell by a first connection line, and wherein a lower portion of the cut body is connected to a negative pole of the other secondary battery cell by a second connection line.

2. The safety switch of the secondary battery module for the electric vehicle of claim 1, wherein the cutting member includes a cutting body supporting part attached to the one secondary battery cell and wherein the cutting body protrudes outwardly from the cutting body supporting part and comprises an end formed of a blade.

3. The safety switch of the secondary battery module for the electric vehicle of claim 1, wherein the cut member attached to the other secondary battery cell includes a cut body supporting part including a cutting body inserting groove into which the cutting body is inserted and a cut body stacked on the entire surface of the cut body supporting part and having a cutting part cut by the cutting body at the center of a plate.

4. The safety switch of the secondary battery module for the electric vehicle of claim 3, wherein the cut body is connected to the other secondary battery cell and is formed in a fuse structure fused when short-circuit current is generated.

5. The safety switch of the secondary battery module for the electric vehicle of claim 4, wherein the cut body is provided with a plurality of holes or notches to facilitate cutting and fusing.

6. The safety switch of the secondary battery module for the electric vehicle of claim 4, wherein the cutting member and the cut member are protected by a material absorbing heat and spark generated when the cut body is fused.

7. The safety switch of the secondary battery module for the electric vehicle of claim 4, wherein the cutting member and the cut member are applied with a flame-retardant insulating material.

8. A charge and discharge system of a secondary battery module for an electric vehicle, comprising:
   a secondary battery module for the electric vehicle configured by stacking at least two secondary battery cells supplying power to an electric vehicle;
   a charger in which power generated by the secondary battery module for the electric vehicle is charged;
   a driving motor supplied with power from the secondary battery module for the electric vehicle to generate power;
   an inverter unit controlling the speed and direction of the driving motor;
   a battery relay unit controlling the connection between the secondary battery module and the driving motor for the electric vehicle; and
   at least one safety switch provided between the secondary battery cells configuring the secondary battery module for the electric vehicle and any one of claims 1 to 7 of which the electrical disconnection operation is controlled according to the displacement due to the swelling phenomenon of the secondary battery module for the electric vehicle.

9. The charge and discharge system of the secondary battery module for the electric vehicle of claim 8, wherein the safety switch of the secondary battery module for the electric vehicle is operated when a displacement is generated in the secondary battery module for the electric vehicle to interrupt the circuit connection between the secondary battery module and the driving motor for the electric vehicle.

* * * * *

UNITED STATES PATENT AND TRADEMARK OFFICE
CERTIFICATE OF CORRECTION

PATENT NO. : 8,547,069 B2 Page 1 of 1
APPLICATION NO. : 12/989907
DATED : October 1, 2013
INVENTOR(S) : Sooyeup Jang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Fifteenth Day of September, 2015

Michelle K. Lee
*Director of the United States Patent and Trademark Office*